United States Patent [19]

Graham

[11] Patent Number: 4,680,321

[45] Date of Patent: Jul. 14, 1987

[54] AGGLOMERATION

[75] Inventor: Everett S. Graham, Sarnia, Canada

[73] Assignee: Polysar Limited, Sarnia, Canada

[21] Appl. No.: 794,374

[22] Filed: Nov. 4, 1985

[30] Foreign Application Priority Data

Nov. 26, 1984 [CA] Canada ................................... 468636

[51] Int. Cl.⁴ ........................... C08J 3/06; C08L 9/04; C08L 9/08; C08L 9/10

[52] U.S. Cl. .................................... 523/335; 528/483; 528/486; 528/487; 528/488; 528/490; 528/494; 528/495; 528/503

[58] Field of Search ................ 523/335; 528/483, 486, 528/487, 488, 490, 494, 495, 503

[56] References Cited

U.S. PATENT DOCUMENTS 3,032,524 5/1962 Brewer ........................... 523/335 X
3,761,455 9/1973 Tanaka et al. ................... 528/490 X

FOREIGN PATENT DOCUMENTS 710874 6/1965 Canada ................................ 523/335
774644 12/1967 Canada ................................ 523/335

*Primary Examiner*—Joseph L. Schofer
*Assistant Examiner*—F. M. Teskin
*Attorney, Agent, or Firm*—Stevens, Davis, Miller & Mosher

[57] ABSTRACT

Many synthetic latices are produced with a small particle size. It is desirable to increase the particle size and concentrate the latex. It is known to use agglomerating agents to increase particle size. The temperature of agglomeration may be reduced if the latex is destabilized with a weak acid, preferably carbonic acid. This results in an energy saving for the process.

9 Claims, No Drawings

AGGLOMERATION

Latices of synthetic polymers are useful in a number of applications including beater addition processes for making paper, web saturation processes for improving paper strength, paper coating, foam backings on textiles and carpets, adhesives, the modification of bitumen or asphalt, and the modification of hydraulic concrete. Many of these applications require a latex having a high solids content and a relatively low viscosity. Generally, latices of polymers of conjugated diolefins and vinyl or vinylidene compounds are polymerized to a relatively low solids content, then concentrated. It is usual to agglomerate the latex prior to concentration to enable a higher total solids level (at a given viscosity) to be achieved during concentration.

BACKGROUND OF THE INVENTION

A number of processes are known for agglomerating latex. Freeze agglomeration requires freezing, then thawing the latex. Pressure agglomeration requires subjecting the latex to a high shear. Known methods of chemical agglomeration usually require heating the latex at temperatures in excess of 40° C. These processes are energy intensive and may require specialized equipment.

Canadian Pat. No. 710,874, issued June 1, 1965, in the name of the Polymer Corporation, discloses the agglomeration of latices by adding thereto an agglomerating agent and a surfactant. The agglomerating agent and the surfactant are similar to the type required in the present invention. Unfortunately, the disclosure gives no indication of the time or temperature conditions required to agglomerate the latex. In practice, these reactions are slow and require times on the order of tens of hours of heating the latex at 40°–55° C.

Canadian Pat. No. 774,644, issued Dec. 26, 1967, to Polymer Corporation Limited, discloses chemically agglomerating nitrile latices by heating them at temperatures above 40° C. for a period of time from one minute to 48 hours. The disclosure makes it clear that longer times are required at lower temperatures.

THE INVENTION

The present invention is distinct over the above art in that it requires a reduction in pH of the latex and provides a lower temperature at which agglomeration takes place and short treatment times. The present invention is an improvement because it requires less heat energy than in the previous art.

The present invention provides a process for agglomerating the particles of a latex of a synthetic polymer stabilized with a pH sensitive emulsifier which comprises:
(i) adjusting the pH of the latex to from about 7.7 to about 9.5 with a weak acid,
(ii) adding to the latex a mixture of
  (a) from about 0.01 to about 1.0 parts by weight per 100 parts by weight of polymer of an agglomerating agent of the formula

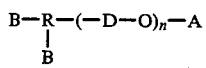

wherein
R is an organic hydrophobic radical,
A is H or a radical of the formula: $R-(-D-O)_m H$,
B is H or $(D-O)_q H$
D is a $C_{2-5}$ alkylene radical,
m, n and q are integers from 23 to about 455; and
  (b) from about 0.01 to about 5 parts per 100 parts of polymer solids of a dispersing agent;
(iii) maintaining the latex at a temperature from about 20 to less than about 40° C. for a period of time sufficient to agglomerate the polymer particles in the latex; and
(iv) adjusting the pH of the agglomerated latex to above 9.5.

Generally, the agglomeration of the polymer particles in the latex takes from about 2 to about 6 hours, preferably 4 to 6 hours, using the procedures of the present invention.

DETAILED DESCRIPTION OF THE INVENTION

In a preferred embodiment, the process of the present invention is used with a further step comprising concentrating the latex. One simple method for relating solids content and viscosity is to concentrate the latex to a viscosity of 12 poise as measured at 25° C. on a Brookfield LVF Viscometer using a No. 3 spindle at 30 r.p.m. and to measure the solids contents of the resulting latex. The process of the present invention, used in conjunction with a concentration process permits the latex to be concentrated to a 12 poise solids of at least 55 percent and more preferably in the range from about 60 to 65 percent. Conventional concentration processes involves removing water from the latex. This may be done in a number of ways which are well known in the art. A particularly useful method is evaporation of water from a thin flowing film of latex.

The present invention is useful with synthetic latices. The latex generally contains a polymer of a $C_{4-8}$ conjugated diolefin and a vinyl or vinylidene compound. The conjugated diolefin is generally present in an amount of at least about 60 percent by weight, more preferably from about 60 to 90 percent by weight of the polymer. The vinyl or vinylidene compound is present up to about 40 percent by weight, preferably from about 40 to 10 percent by weight of the polymer.

Suitable conjugated diolefins include 1-3, butadiene and isoprene. Suitable vinyl or vinylidene monomers include monomers containing the structure

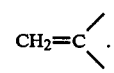

Such monomers include styrene, α-methyl styrene, para methyl styrene, chlorostyrene, vinyl chloride, vinylidene chloride and $C_{3-5}$ alkenyl nitriles such as acrylonitrile.

A preferred polymer contains about 10 to 40 percent, preferably from about 15 to 40 percent, bound acrylonitrile and the balance conjugated diolefin. The polymers useful in accordance with the present invention are made by conventional emulsion polymerization techniques at pH's of greater than about 9 using a pH sensitive emulsifier. As used in this specification, the term pH sensitive emulsifier refers to an emulsifier which loses its capacity to stabilize an emulsion with declining pH. Typically, these emulsifiers are alkali metal soaps of naturally occurring ethylenically unsaturated acids. The acids usually contain from about 12 to 18 carbon atoms. Such emulsifiers include sodium or potassium salts of stearic acid, oleic acid, lauric acid, and salts of mixed oils such as palm oil. The soap may be an alkali soap of rosin acid (abietic acid). Usually, most synthetic surfactants are effective over a broad pH range and are not considered pH sensitive.

In the process of the present invention, it is most important to adjust the pH of the latex to from about 7.7 to 9.5, preferably from about 8.5 to 9.5, with a weak acid or an agent which generates an acid. Desirably, the pH of the latex is adjusted to from about 8.5 to 9.0. The pH of the latex should be adjusted with a weak acid such a carbonic acid or boric acid. It is possible to use very dilute mineral or organic acids. Agents which hydrolize to generate acid may also be used to adjust the pH. An alkali metal silicofluoride such as sodium silicofluoride may be used to adjust the pH. Preferably the acid is carbonic acid which is generated in situ by introducing carbon dioxide into the latex.

The process of the present invention requires the addition of a mixture of an agglomerating agent and a dispersing agent to the latex. The dispersing agent is used to minimize the formation of coagulum when the agglomerating agent is added to the latex.

The agglomerating agent has the formula:

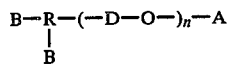

wherein
R is an organic hydrophobic radical;
A is H or a radical of the formula: R—(D—O)$_m$—H;
B is H or (—D—O)qH;
D is C$_{2-5}$ alkylene radical, preferably a —CH$_2$—CH$_2$ group; and
m, n and q are integers from 23 to 455.

In the above formula the hydrophobic group R may be a C$_{12-18}$ ethylenically unsaturated radical such as stearoyl, oleoyl, or lauroyl radicals. The hydrophopic group may be the reaction of nonyl phenol and toluene diisocyanate or an aromatic diisocyanate. One particularly suitable hydrophobic group is prepared by reacting a diphenol alkane with epichlorohydrin in a molar ratio of 2:1.

Particularly useful diphenol alkanes are bis-diphenol C$_{3-5}$ alkanes such as 2,2-bis(4-hydroxy phenyl)propane, 2,2-bis(4-hydroxy phenyl)butane, and 2,2-bis(4-hydroxy phenyl)pentane.

The hydrophobic group is then reacted with a poly C$_{2-5}$ alkylene glycol containing about 23 to 455 alkylene glycol units having a molecular weight from about 1,000 to about 20,000. The ratio of hydrophobic groups to poly C$_{2-5}$ alkylene glycol groups may range from about 1:3 to 2:1.

A particularly preferred agglomerating agent is commercially available under the Trademark "Carbowax 20-M". It is believed that this is obtained by reacting the diepoxide formed by condensing epichlorhydrin with 2,2-bis(4-hydroxy phenyl)propane in a 2:1 molar ratio, with polyethylene glycol having a molecular weight of about 6,000. The resulting product is believed to have a molecular weight from about 15,000 to 20,000.

The agglomerating agent may be added to the latex in an amount from about 0.01 to about 1 part by weight per 100 parts by weight of latex. Preferably, the agglomerating agent is used in an amount from about 0.05 to 0.50 parts by weight per 100 parts by weight of polymer in the latex.

To reduce coagulum, the agglomerating agent is added to the latex together with a dispersing agent. The dispersing agent may be used in amounts from about 0.01 to 5 parts by weight per 100 parts by weight of polymer. Preferably, the dispersing agent is used in amounts of about 0.2 to 2 parts by weight per 100 parts by weight of polymer. The dispersing agent should be selected so that it is compatible with the end use of the latex. The dispersing agent may be synthetic such as an alkali metal salt of the condensation product of beta naphthalene sulfonic acid and formaldehyde (i.e. Daxad TM 17). The dispersant may be a salt of a naturally occurring fatty acid or oil such as an alkali metal oleate, stearate, palmitate or a salt of rosin acid.

The latex is treated at a temperature less than about 40° C. for a time sufficient to agglomerate the polymer particles in the latex. Usually this is from about 3 to 6 hours. Preferably, the latex is maintained at a temperature from about 35° to 38° C. At lower temperatures, longer times and/or a larger amount of agglomerating agent is required to agglomerate the latex.

To stop the latex agglomeration, the pH of the latex is raised above 9.5 with any suitable base.

The progress of the agglomeration process can be conveniently determined by periodic measurement of the surface tension of the liquid-air interface of the latex. The increase in particle size is accompanied by a decrease in surface tension. This decrease is believed due to the fact that the increase in particle size by agglomeration is accompanied by an effective decrease in surface area of the particles, so that an increasing proportion of the surface active components enter the aqueous phase and reduce the surface tension. Full chemical agglomeration is considered to have been obtained when the surface tension stops, or almost stops, dropping.

The temperature at which the heat treatment is carried out, the length of time taken by the treatment, the concentration of the agglomerating agent and the concentration of the dispersing agent are interrelated variables whose values for a particular process can readily be determined by experiment. In general, the temperature to be employed may be determined primarily by the equipment available for carrying out the process, but the use of lower concentrations of the agglomerating agent will permit the use of higher temperatures without the formation of excessive coagulum, and vice versa. The heating time can be decreased as the temperature is increased and/or as the concentration of the agglomerating agent is increased, and are usually within the limits specified, depending upon the rate at which it is desired that the agglomeration should take place. Normally, a very rapid agglomeration should be avoided. It is found that the temperature, time and/or concentration of the agglomerating agent can be decreased as the latex solids content is increased.

As noted above, in the initial stages of the treatment, the surface tension drops to a medium level. After sufficient treatment, the surface tension decreases considerably, believed due to an increase in particle coalescence with consequent increased coverage by the emulsifier, increasing amounts of the emulsifier now entering the aqueous phase. When the latex is fully agglomerated, the surface tension is at a low level. Thus, the treatment can be terminated when periodic checks of the surface tension show that it has stopped or almost stopped decreasing. The agglomerated latex is then concentrated to the desired solids content, preferably using concentrating equipment that will apply minimum mechanical shear conditions.

The following examples are intended to illustrate the invention and not to limit it. In the examples, unless otherwise indicated, parts means parts by weight, temperature is in degrees C., and phls means parts pure additive by weight per 100 parts of latex solids.

An acrylonitrile butadiene latex was prepared in the presence of a rosin acid soap stabilizer. The polymer had about 30 percent bound ACN. The latex initially contained about 34 percent solids and had an average particle size of 500 Å*. The temperature of the latex was 27° C. The latex was adjusted to various pH's with $CO_2$ and then a mixture of 0.20 phls of Carbowax 20M (Trademark) and 0.5 phls of rosin acid soap was added to the latex uniformly during 10 to 15 minutes. The latex was heated to 38° C. and held there for four hours. The results are recorded in Table 1. The pH of 8.9 in Run No. 3 was the optimum carbonation pH level in this set of experiments because it gave the highest 12 poise solids level (60.0%) at an acceptable 80 mesh coagulum level (0.10%).

*-Because of its small particle size, the base latex had a relatively low 12 poise solids level of 49.8 percent when concentrated without the prior treatment according to this invention.

TABLE 1

CHEMICAL AGGLOMERATION OF DILUTE NBR LATEX
USING CARBONATION AND MEDIUM TEMPERATURES
Effect of Latex pH With 0.20 phls
Carbowax 20-M/0.5 phls Rosin Acid Soap

| Run Number | 1 | 2 | 3 | 4 |
|---|---|---|---|---|
| 1. Total Solids, Temperature and pH Adjustment of Base Latex | | | | |
| Temperature (°C.) | 27 | 27 | 27 | 27 |
| Total solids (%) | 34.0 | 34.0 | 34.0 | 34.0 |
| Carbonation pH | 10.2* | 9.0 | 8.9 | 8.8 |
| 2. Chemical addition during 10–15 minutes | | | | |
| Carbowax 20-M/ | 0.20/ | 0.20/ | 0.20/ | 0.20/ |
| Rosin acid soap (phls) | 0.50 | 0.50 | 0.50 | 0.50 |
| After 4 hours of heating at 38° C. | | | | |
| 80 mesh coag. (%) | 0.01 | 0.01 | 0.10 | 0.78 |

TABLE 1-continued

CHEMICAL AGGLOMERATION OF DILUTE NBR LATEX
USING CARBONATION AND MEDIUM TEMPERATURES
Effect of Latex pH With 0.20 phls
Carbowax 20-M/0.5 phls Rosin Acid Soap

| Run Number | 1 | 2 | 3 | 4 |
|---|---|---|---|---|
| pH | 10.2 | 9.6 | 9.6 | 9.4 |
| Surf. Ten. (dynes/cm) | 40.4 | 36.1 | 34.9 | 35.7 |
| 3. After pH Adjustment With KOH and 80 Mesh Screening | | | | |
| KOH added (phls) | Nil | 0.23 | 0.26 | 0.45 |
| pH | 10.2 | 10.1 | 10.1 | 10.1 |
| Surf. Ten. (dynes/cm) | 40.4 | 34.9 | 34.7 | 36.0 |
| 4. After Lab Vacuum Concentration and 80 Mesh Screening | | | | |
| 325 mesh coag. (%) | 0.01 | 0.01 | 0.01 | 0.01 |
| Total solids (%) | 53.6 | 59.5 | 61.4 | 61.3 |
| pH | 10.1 | 10.1 | 10.1 | 10.4 |
| Visc. LVF #3 at 30 rpm (poise) | 21.2 | 17.6 | 20.0 | 14.4 |
| Est. 12 poise solids (%) | 52.0 | 58.5 | 60.0 | 60.8 |
| Ave. part. size by K oleate titr. (Å) | 560 | 935 | 985 | 1035 |
| Surface Tension at 30% TS (dynes/cm) | 39.2 | 35.1 | 34.7 | 36.3 |

*No Carbonation

An isoprene acrylonitrile latex containing about 30 percent bound ACN was prepared in the presence of potassium oleate stabilizer. The latex had a solids content of about 32 percent and an average particle size of 600 Å*. The latex was adjusted to a specified pH with carbon dioxide. The temperature of the latex was 27° C. The latex was adjusted to various pH's with $CO_2$ and then a mixture of 0.35 phls Carbowax 20-M (trademark) and 1.2 phls of the dispersing agent, Daxad 17 (trademark), was added to the latex uniformly during to 10 to 15 minutes. The latex was heated to 38° C. and held there for 4 hours. The results are set forth in Table II. The pH of 8.6 in Run No. 3 was the optimum carbonation pH level in this set of experiments because it gave the highest 12 poise solids level (61.5%) at an acceptable 80 mesh coagulum level (0.22%).

*-Because of its small particle size, the base latex had a relatively low 12 poise solids level of 50.7 percent when concentrated without the prior treatment according to this invention.

TABLE II

CHEMICAL AGGLOMERATION OF DILUTE NIR LATEX
USING CARBONATION AND MEDIUM TEMPERATURES
Effect of Latex pH With 0.35 phls Carbowax 20-M/1.2 phls Daxad 17

| Run Number | 1 | 2 | 3 | 4 |
|---|---|---|---|---|
| 1. Total solids, temperature and pH adjustment of base latex | | | | |
| Total solids (%) | 32.0 | 32.0 | 32.0 | 32.0 |
| Temperature (°C.) | 27 | 27 | 27 | 27 |
| Carbonation pH | 9.0 | 8.7 | 8.6 | 8.5 |
| 2. Chemical addition during 10–15 minutes | | | | |
| Carbowax 20-M/Daxad 17 (phls) | 0.35/1.2 | 0.35/1.2 | 0.35/1.2 | 0.35/1.2 |
| After 4 hours of heating at 38° C. | | | | |
| 80 mesh coagulum (%) | 0.01 | 0.10 | 0.22 | 0.50 |
| Calculated total solids (%) | 31.5 | 31.5 | 31.5 | 31.5 |
| pH | 9.2 | 9.0 | 9.1 | 9.0 |
| Surface tension (dynes/cm) | 39.2 | 38.1 | 36.5 | 37.0 |
| 3. After stabilization with K oleate (using 18.25% solution), pH adjustment and 80 mesh screening | | | | |
| KOH/K oleate added (phls) | 0.17/1.5 | 0.17/1.5 | 0.27/1.5 | 0.22/1.5 |
| pH | 10.1 | 10.1 | 10.1 | 10.1 |
| Surface tension (dynes/cm) | 35.2 | 33.5 | 32.0 | 32.0 |
| 4. After lab vacuum concentration and 80 mesh screening | | | | |
| 325 mesh coagulum (%) | 0.02 | 0.01 | 0.01 | 0.01 |
| Total solids (%) | 59.5 | 61.1 | 62.3 | 62.6 |
| pH | 10.0 | 10.0 | 10.2 | 10.0 |
| Visc. - LVF #3 @ 30 rpm (poise) | 28.0 | 16.8 | 16.4 | 12.8 |
| Estimated 12 poise solids (%) | 57.2 | 60.2 | 61.5 | 62.4 |
| Ave. part. size by soap titr (Å) | 910 | 1020 | 1030 | 1075 |

TABLE II-continued
CHEMICAL AGGLOMERATION OF DILUTE NIR LATEX USING CARBONATION AND MEDIUM TEMPERATURES
Effect of Latex pH With 0.35 phls Carbowax 20-M/1.2 phls Daxad 17

| Run Number | 1 | 2 | 3 | 4 |
|---|---|---|---|---|
| Surf. tension at 30% TS (dynes/cm) | 35.8 | 33.6 | 31.2 | 31.9 |

What is claimed is:

1. A process for agglomerating the particles of a latex of a synthetic polymer derived from monomers comprising at least about 60 percent of a monomer selected from the group consisting of butadiene, isoprene and a mixture thereof; and not more than 40 percent of a monomer selected from the group consisting of styrene, α-methyl styrene, p-methyl styrene, chlorostyrene, vinyl chloride, vinylidene chloride, acrylonitrile and a mixture thereof, stabilized at a pH of greater than 9 with a pH sensitive emulsifier which comprises:
(i) adjusting the pH of the latex to from about 7.7 to about 9.5 with a weak acid;
(ii) adding to the latex
  (a) from about 0.01 to about 1.0 parts by weight per 100 parts by weight of polymer of an agglomerating agent of the formula

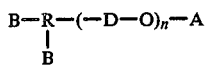

wherein
R is an organic hydrophobic radical,
A is H or a radical of the formula $R-(-D-O)_mH$,
B is H or $(D-O)qH$
D is a $C_{2-5}$ alkylene radical,
m, n and q are integers from 23 to about 455; and
  (b) from about 0.01 to about 5 parts per 100 parts of polymer solids of a dispersing agent,
(iii) maintaining the latex at a temperature from about 20 to less than 40° C. for a period of time from about 2 to 6 hours so as to agglomerate the polymer particles of the latex;
(iv) adjusting the pH of the agglomerated latex to above 9.5.

2. A process according to claim 1 further including concentrating the latex to a 12. poise solids content of at least 55 percent.

3. A process according to claim 2 wherein the pH of said latex is adjusted to from about 8.5 to about 9 with a weak acid selected from carbonic acid, boric acid or weak mineral or organic acid.

4. A process according to claim 3 wherein said agglomerating agent is the reaction product of a polyethylene glycol having a molecular weight of about 6000 with the diepoxide formed by reacting epichlorohydrin with a bis-diphenol $C_{3-5}$ alkane in a molar ratio of about 2:1 and is present in an amount from about 0.05 to about 0.50 parts per 100 parts of polymer.

5. A process according to claim 4 wherein in said agglomerating agent at least one B group is H, and R is chosen from the group, stearoyl, oleoyl, lauroyl, and the reaction product of nonyl phenol and toluene diisocyanate radicals.

6. A process according to claim 5 wherein said dispersing agent is present in an amount from about 0.2 to 2 parts per 100 parts by weight of polymeric material and is selected from the group rosin acid soap, alkali salts of $C_{12-18}$ fatty acids, and alkali salts of the condensation product of beta naphthalene sulfonic acid and formaldehyde.

7. A process according to claim 6 wherein the pH sensitive emulsifier is selected from rosin acid soap and alkali soaps of $C_{12-18}$ fatty acids.

8. A process according to claim 7 wherein said weak acid is carbonic acid which is generated in situ by injection of $CO_2$ into the latex.

9. A process according to claim 8 wherein said polymer is derived from about 15 to 35 percent acrylonitrile and from about 85 to 65 percent butadiene.

* * * * *